July 23, 1963  J. D. SULLIVAN  3,098,758
VITREOUS ENAMEL-COATED FERROUS ARTICLE AND
METHOD OF MAKING THE SAME
Filed May 19, 1961
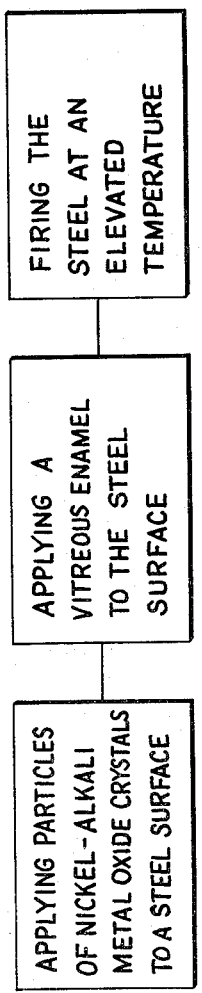
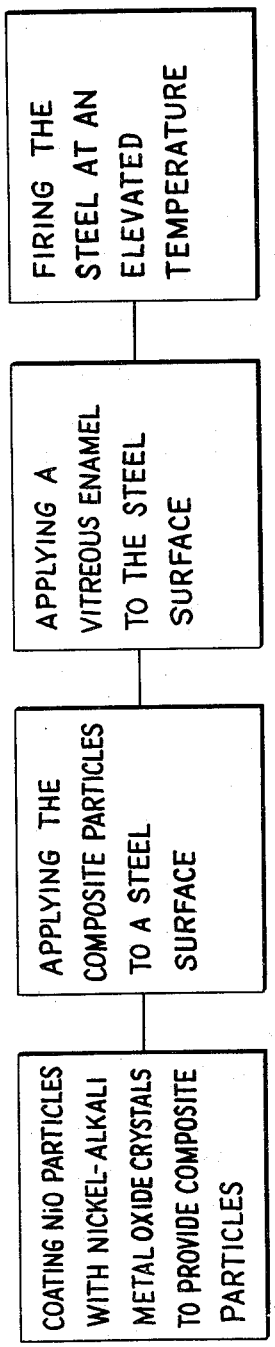
INVENTOR.
JAMES D. SULLIVAN
BY
Andrus & Starke
ATTORNEYS United States Patent Office 3,098,758
Patented July 23, 1963

3,098,758
VITREOUS ENAMEL-COATED FERROUS ARTICLE AND METHOD OF MAKING THE SAME
James D. Sullivan, Pewaukee, Wis., assignor to A. O. Smith Corporation, Milwaukee, Wis., a corporation of New York
Filed May 19, 1961, Ser. No. 111,191
14 Claims. (Cl. 117—70)

This invention relates to a vitreous enamel-coated ferrous article and to a method of fabricating the same.

When a steel or other ferrous article is coated with glass or vitreous enamel, the article is heated at an elevated temperature of about 1600° F. to fuse the glass to the steel. At this elevated temperature, water or moisture from the atmosphere reacts with the iron to form atomic hydrogen and iron oxide. The atomic hydrogen which is formed on the surface of the steel penetrates into the steel and is thought to partially remain as atomic hydrogen in the steel crystal lattice and to partially collect as molecular hydrogen in the voids or rifts therein. When the steel is cooled after the firing treatment, the molecular hydrogen, being less soluble in the cool steel than in the hot steel, will tend to pass out of the steel. If the steel is covered with a glass or vitreous enamel coating, the hydrogen will collect beneath the coating and when the pressure builds up to a sufficient degree, small portions of the coating will pop off, resulting in what is known as fishscaling of the glass coating.

Patent No. 2,940,865, entitled "Method of Applying a Glass Coating to Steel by Using an Intermediate Layer of Nickelous Oxide and Article Produced Thereby," of the same inventor, is directed to a process of eliminating fishscaling and other hydrogen defects when coating a ferrous article with vitreous enamel by applying a coating of nickelous oxide to the steel prior to glass coating. To provide the most effective results, it has been found that the nickelous oxide should be substantially free of impurities, and thus the chemically pure grade or catalytic grade of nickelous oxide is generally employed in the process. The catalytic grade is designated as having less than 1% of other oxide impurities and costs substantially more than the ceramic or technical grade of nickelous oxide which has less than 5% of metal oxide impurities.

The present invention is directed to a method of glass coating steel in which the impure, less costly grades of nickelous oxide can be employed in an intermediate coating, and yet the coating acts to eliminate fishscaling and other hydrogen defects in the glass or vitreous enamel. This process also has a very beneficial effect on the adherence of glass and ceramic coatings to steel or other ferrous metals.

According to the invention, the steel or other ferrous base is coated with a layer of finely divided, nickel-alkali metal oxide crystalline particles. The crystalline particles are generally applied as an aqueous suspension or slurry and after the slurry is dried, the vitreous enamel or glass composition is applied to the steel and subsequently fired at an elevated temperature to fuse the glass to the steel. It has been found that the mixed nickel-alkali metal oxide particles are more effective in reducing fishscaling and other hydrogen defects than a similar concentration of either the catalytic or ceramic grade of nickelous oxide alone. Furthermore, the nickel-alkali metal oxide crystals can be employed in combination with the impure ceramic grade of nickelous oxide and this reduces the amount of the pure catalytic grade nickelous oxide to be used and therefore substantially reduces the overall cost of the process.

Moreover, the use of the nickel-alkali metal oxide particles results in a more easily controlled process in that the concentration limits are not as critical as when using nickelous oxide alone.

As the nickel-alkali metal oxide particles reduce the development of atomic hydrogen in the steel and decrease the build-up of molecular hydrogen beneath the glass coating, fewer bubbles will be formed in the solidified glass and this results in a more dense coating of glass and a greater degree of protection for the steel or base metal.

The use of the nickel-alkali metal oxide crystalline particles as the intermediate coating also improves the adherence of the glass or vitreous enamel to the base metal and thereby eliminates the use of adherence promoters, such as cobalt oxide, in the glass. By eliminating the dark blue colored cobalt oxide from the glass, single coats of white or light colored glass can be applied directly to the base metal as a single glass coating.

The drawings illustrate the best mode presently contemplated of carrying out the invention.

In the drawings:

FIG. 1 is a flow sheet showing the steps in the process of the invention in which nickel-alkali metal oxide crystals are applied to the steel base; and FIG. 2 is a flow sheet showing the steps of a modified form of the invention in which nickel-alkali metal oxide crystals are applied to a core of nickelous oxide to provide composite particles which are applied to the steel base.

The base metal to which the nickel-alkali metal oxide particles are applied may take the form of any ferrous metal such as relatively low carbon steel, commonly referred to as enameling iron and having a carbon content of 0.01% to 0.03%, higher carbon steel having a carbon content up to 0.50%, or cast iron.

The intermediate coating applied to the steel base may take the form of finely divided nickel-alkali metal oxide crystals, or it may take the form of finely divided particles composed of a core of nickelous oxide surrounded by, or individually coated with, a layer of nickel-alkali metal oxide crystals. In either form it is necessary that nickel-alkali metal oxide crystalline particles be employed in which each crystal is composed of a compound of the reaction product of nickelous oxide and an alkali metal oxide. It has been found that mechanically mixing nickelous oxide and lithium oxide and applying this mixture to the steel does not produce the desired result because this mixture of the separate oxides reduces wetting and causes pitting. Therefore it is necessary that the intermediate coating contain finely divided particles of nickel-alkali metal oxide crystals. For economic reasons it is generally preferred to employ the nickel-alkali metal oxide crystals as a coating on the nickelous oxide nucleus, for the nucleus can be the impure ceramic grade of nickelous oxide. The pure catalytic grade of nickelous oxide produces no advantage in this case and by using the ceramic grade of nickelous oxide, the overall cost of the process is reduced. However, the nucleous particles must be nickelous oxide, for other core or filler materials do not bring about the desired results.

The intermediate oxide coating is applied to the base in a concentration of over 0.05 gram per square foot of steel base. A concentration of the coating below 0.05 gram per square foot of ferrous base has no appreciable effect in decreasing the hydrogen defects in the glass coating subsequently applied. The maximum concentration is not critical but for economic purposes the upper limit of concentration is generally maintained below 1.0 gram per square foot.

The alkali metal which is preferred to be used in the nickel-alkali metal oxide crystal is lithium. However, it has been found that other alkali metals, such as sodium and potassium, can also be used with comparable results.

To produce the nickel-alkali metal oxide crystalline structure, a nickel compound, such as nickelous nitrate, is initially heated to a temperature of about 280° F. to melt the same. Lithium carbonate or other alkali metal carbonate is added to and dissolved in the molten nickelous nitrate. The molten mixture is then heated to a temperature of 400° F. to 600° F. for a period of 1 to 10 hours to decompose the nitrates and carbonates and to nucleate the precipitation of fine nickel-lithium oxide crystals. After this period of heating, the mixture is heated to a temperature in the range of 1030° F. to 1080° F. for a period of 1 to 10 hours to obtain crystal growth to the most suitable size for application to the ferrous base.

The crystal mixture is then cooled to room temperature to provide an agglomerated mass which is subsequently broken up by crushing into finely divided crystalline particles having a particle size smaller than 74 microns (200 mesh, U.S. Standard Sieve Series). The individual nickel-alkali metal oxide crystals individual in the particles have a size in the range of 0.1 to 3.0 microns.

As an alternate method, about 5% to 80% of finely divided particles of the ceramic grade of nickelous oxide can be added to the molten mixture of the substantially pure mixture of nickelous nitrate and lithium carbonate. The nickelous oxide particles have a particle size smaller than 200 mesh (U.S. Standard Sieve Series) and generally a size such that 95% will pass through a 325 mesh screen. A 325 mesh screen is equivalent to a size of about 44 microns. The molten mixture is heated as described above and the nickel-lithium oxide crystals develop on the nickelous oxide particles and coat the same. After heating, the agglomerated mass is broken up by crushing into particles having a size of smaller than 200 mesh. With this method the impure nickelous oxide serves as a carrier for the pure nickel-lithium oxide crystals and reduces the proportion of the nickel-litihum oxide crystals in the overall coating and thereby substantially reduces the costs of the coating without destroying the effectiveness.

Another method of forming the nickel-lithium oxide crystal structure is to heat a mixture of nickelous oxide and lithium carbonate to a temperature in the range of 1200° F. to 1600° F. and preferably about 1480° F. The lithium carbonate melts at a lower temperature than the nickel oxide and therefore a substantial portion of the lithium oxide will be volatilized by the time this temperature range has been reached. Nevertheless, the remaining non-volatilized lithium oxide will diffuse into the nickelous oxide at this temperature to form the nickel-lithium oxide crystal structure.

In general, the nickel-alkali metal oxide crystals, whether used alone as the intermediate coating on the steel base or used as a surrounding layer on nickelous oxide particles, contain from 0.5% to 12.0% of the alkali metal oxide with about 1% to 3% being preferred.

The glass composition to be applied to the coated ferrous base may be any of the conventional glass or vitreous enamel compositions ordinarily used in the art.

The oxide coating can be applied to the ferrous base in any desired manner. Generally, the finely divided crystalline particles are suspended in an aqueous or other evaporable carrier and applied to the ferrous base in the form of a slurry. An example of an aqueous suspension which can be sprayed onto the ferrous article is as follows in weight percent:

| | Percent |
|---|---|
| Nickel-alkali metal oxide crystalline particles | 5–30 |
| Silica | 0–40 |
| Bentonite | 0–10 |
| Sodium carbonate | 0–1 |
| Sodium nitrite | 0–1 |
| Water | Balance |

The silica employed in the aqueous suspension is a diluting material or filler which helps distribute the nickel-alkali metal oxide crystals, helps to extend the applied solids weight limits into a more usable range, and aids in the suspension. Bentonite is a conventional suspending agent which tends to maintain the crystals in suspension in the water and the sodium carbonate and sodium nitrite serve as corrosion inhibitors for the base metal during the application. The mill additions, such as the fillers, suspending agents and corrosion inhibitors, do not take part in any chemical reaction occurring during firing nor in any way affect the characteristics or properties of the glass coating applied to the surface of the ferrous article. It is desirable, however, when using a filler or suspending agent, to use one that has a minimum of chemically combined water which will dissociate at elevated temperatures to form atomic hydrogen in the glass-steel fusion reaction.

The oxide coating particles, which may be the pure nickel-alkali metal oxide crystals or the nickel-alkali metal oxide crystals coated on nickelous oxide nuclei, should have a particle size finer than 200 mesh to prevent excessive local concentrations and to insure an adequate surface area of the crystalline structure. Generally the particle size should be such that all the particles will pass through a 200 mesh screen (U.S. Standard Sieve Series) and 90% will pass through a 325 mesh screen.

The aqueous or other evaporable liquid suspension of the oxide coating particles can be applied to the ferrous base by spraying, dipping, slushing, brushing, or the like, and the ferrous article is then heated at a temperature generally in the range of 100° F. to 500° F. to evaporate the liquid and leave the dried coating on the base.

In place of the aqueous suspension, in some cases it is possible to dry dust the finely divided particles of the oxide coating on the ferrous base, and in this case, no drying operation would be required. Similarly, in some instances the particles of the oxide coating can be applied to the steel base by grit or shot blasting the steel with shot or grit composed of the oxide coating material.

In carrying out the glass coating operation the steel or other ferrous base is initially cleaned by sand blasting, pickling, shot blasting or the like to provide a clean, roughened surface. After the cleaning operation, a suspension of the oxide coating particles is applied to the clean steel surface and the steel is heated at a temperature of 100° F. to 500° F. to evaporate the water or other evaporable carrier. The glass composition is then applied to the steel. Normally the glass is applied to the coated surface, but it has been found that effective results can also be obtained by applying the glass coating to the opposite, uncoated surface of the steel, or alternately it is possible to coat both surfaces of the steel with the oxide coating and subsequently apply the glass coating to either one or both of the coated surfaces.

After the glass has been applied to the steel, the steel is heated to a temperature of about 1600° F. to fuse the glass to the steel. The nickel-alkali metal oxide particles of the coating tend to reduce the formation of hydrogen at the metal surface during the firing operation and thereby eliminate fishscaling and other hydrogen defects in the solidified glass coating. It has been found that the nickel-alkali metal oxide particles are more effective in reducing fishscaling than a similar quantity of concentration of the pure catalytic grade of nickelous oxide and it is possible to employ a substantial proportion of the cheaper technical or ceramic grade of nickelous oxide in combination with the nickel-alkali metal oxide crystals and still maintain effectiveness greater than pure nickelous oxide in reducing fishscaling and other hydrogen defects. This, of course, reduces the cost of the coating and the overall cost of the glass coating operation.

Moreover, the concentration limits of the nickel-lithium oxide particles are not particularly critical for there is no critical upper limit above which the effectiveness of the coating material is reduced. The upper limit of application is a characteristic of the particular glass or ceramic coating used in conjunction and varies with this composition to obtain maximum coating quality.

The coating of nickel-alkali metal oxide crystalline particles substantially improves the adherence of the glass coating to the ferrous base and eliminates the necessity of using additional adherence promoters in the glass. By eliminating the use of adherence promoters, such as the dark blue colored cobalt oxide, in the glass, single coats of light colored glass can be applied directly to the ferrous base. The increase in adherence also eliminates the need for special premium steel or enameling iron and eliminates special etching and cleaning procedures for the ferrous base metal.

*Example No. 1*

Nickelous nitrate was mixed with lithium carbonate in the ratio of 96 parts of the nickel compound to 4 parts of the lithium compound. This mixture was heated to 280° F. and stirred to dissolve the lithium compound in the nickelous nitrate which was molten at this temperature. The mixture was then heated to 550° F. for 3 hours to decompose the nickelous nitrate and to nucleate the precipitation of fine nickel-lithium oxide crystals. The crystals were then heated to 1050° F. for 3 hours for crystal growth to the most suitable size for application to steel prior to the application of a vitreous type coating.

After cooling, the agglomerated crystal structure was crushed by a ball mill to provide crystalline particles having a size of smaller than 75 microns.

A 0.080" x 6" x 12" SAE 1015 hot rolled, rimmed steel plate was blasted with steel grit to remove scale and surface dirt. After blasting, an aqueous suspension of the nickel-lithium oxide crystals having the following composition was sprayed on one surface of the steel plate:

| | Parts by weight |
|---|---|
| Nickel-lithium oxide crystals | 10.0 |
| $SiO_2$ | 10.0 |
| Bentonite | 4.0 |
| Sodium nitrite | 0.9 |
| Water | 76.1 |

The plate was dried for 5 minutes at 200° F. and the resulting coating had a total solids concentration of 0.50 gram per square foot or a concentration of nickel-lithium oxide of 0.20 gram per square foot.

A glass slip containing a frit and a conventional mill addition was then applied directly to the coated steel surface by spraying. The frit had the following composition in weight percent:

| | Percent |
|---|---|
| Silica | 50.8 |
| Sodium oxide | 19.8 |
| Calcium oxide | 5.9 |
| Aluminum oxide | 5.5 |
| Boron oxide | 18.8 |
| Cobalt oxide | 0.5 |

The vitreous enamel-coated steel was then fired at a temperature of 1580° F. for 8 minutes to fuse the vitreous enamel to the steel. The resulting vitreous enamel coating was free of fishscaling and other hydrogen defects and had good adherence to the base metal.

*Example No. 2*

The procedure was identical to Example No. 1 except that sodium carbonate was substituted for lithium carbonate and the resulting crystalline particles were nickel-sodium oxide.

The glass coated steel plate coated with the nickel-sodium oxide particles showed no evidence of fishscaling or other hydrogen defects.

*Example No. 3*

Nickelous nitrate was mixed with lithium carbonate in the ratio of 96 parts of the nickel compound to 4 parts of the lithium compound. This mixture was heated to 280° F. and stirred to dissolve the lithium compound in the nickelous nitrate which was molten at this temperature.

100 grams of ceramic grade nickelous oxide containing about 1.5% oxide impurities and having a particle size of less than 150 microns was then added to 100 grams of the molten mixture. The mixture was then heated to 550° F. for 3 hours to decompose the nickelous nitrate and to nucleate the precipitation of fine nickel-lithium oxide crystals which formed on the nickelous oxide particles. The crystals were then heated to 1050° F. for 3 hours for crystal growth to the most suitable size for application to steel prior to the application of a vitreous type coating.

After cooling to room temperature, the mass was broken up by crushing to provide particles having a size of less than 75 microns.

A steel plate, similar in size and composition to that of Example No. 1, was sand blasted to remove the scale and surface dirt. After blasting, an aqueous suspension of the oxide particles was sprayed onto one surface of the steel plate. The suspension was made as described in Example No. 1. The plate was then dried for 5 minutes at 200° F. and the resulting coating had a total solids concentration of 0.86 gram per square foot and a concentration of nickel-lithium oxide of 0.34 gram per square foot.

A glass slip containing a frit having the following composition in weight percent was then applied to the opposite uncoated surface of the steel by spraying:

| | Percent |
|---|---|
| Silica | 56.0 |
| Feldspar | 15.0 |
| Borax | 12.0 |
| Soda ash | 7.0 |
| Sodium nitrite | 5.0 |
| Fluorspar | 5.0 |

The steel plate was then fired at a temperature of 1580° F. for a period of 8 minutes to fuse the glass to the steel. The resulting glass coated-steel was free of fishscaling and other hydrogen defects and had good adherence to the base metal.

*Example No. 4*

92 parts by weight of nickelous nitrate was heated to 1030° F. for 6 hours to decompose the nitrate and crystallize nickelous oxide. Eight parts by weight of lithium carbonate were then added to the nickelous oxide and the mixture was heated at 1480° F. for 2 hours. During this heat treatment, a portion of the lithium diffused into the nickel compound to produce a nickel-lithium oxide crystalline structure containing 2.0% $Li_2O$ and 97.5% NiO and 0.5% impurities of cobalt, copper, iron and silicon oxides. After cooling, the oxide crystal mass was crushed to a particle size of less than 75 microns.

The nickel-lithium oxide crystals were then applied to the steel surface in an aqueous suspension similar to that of Example No. 1 and subsequently a glass composition having a frit composition similar to that of Example No. 1 was applied directly to the coated steel surface and fired at a temperature of 1580° F. for 8 minutes. The resulting glass coated-steel was free of fishscaling and other hydrogen defects and showed good adherence to the base metal.

Various modes of carrying out the invention are contemplated as being within the scope of the following claims particularly pointing out and distinctly claiming the subject matter which is regarded as the invention.

I claim:

1. A vitreous enamel base stock, comprising a ferrous base having a coating of nickel-alkali metal oxide crystalline particles thereon, said particles being present in an amount greater than 0.05 gram of dry particles per square foot of ferrous base, and said particles serving to eliminate fishscaling and other hydrogen defects during firing of a vitreous enamel to said ferrous base and to improve the adherence of the vitreous enamel to the ferrous base.

2. A vitreous enamel base stock, comprising a ferrous base having a coating of finely divided crystalline particles of nickel-lithium oxide thereon, said crystalline particles being present in the range of 0.05 to 1.0 gram per square foot of ferrous base and said crystalline particles containing lithium oxide in an amount of 0.5% to 12.0% by weight, said coating serving to eliminate fishscaling and other hydrogen defects during firing of a vitreous enamel to said ferrous base.

3. A vitreous enamel base stock, comprising a ferrous base having a coating of finely divided particles thereon, said particles comprising a nucleus of nickelous oxide and an outer layer of nickel-alkali metal oxide crystals bonded to said nucleus, said particles being present in an amount greater than 0.05 gram of dry particles per square foot of ferrous base and serving to prevent hydrogen defects and improve adherence between the ferrous base and a vitreous enamel coating subsequently applied thereto.

4. The structure of claim 3 in which the nickelous oxide comprises from 5% to 80% by weight of said particles.

5. The structure of claim 3 in which the alkali metal is lithium.

6. A vitreous enamel base stock, comprising a ferrous base having a coating thereon, said coating comprising a plurality of finely divided particles of nickelous oxide with each particle being individually coated with a crystalline structure consisting of nickel-lithium oxide crystals, said coating being present in an amount of 0.05 to 1.0 gram per square foot of ferrous base, said nickelous oxide particles comprising from 5% to 80% by weight of the coating, and said crystalline structure containing from 0.5% to 12.0% of lithium oxide.

7. A method of glass coating steel to eliminate fishscaling and other hydrogen defects in the glass coating, comprising applying a coating of finely divided crystalline particles of nickel-alkali metal oxide to the steel surface with said nickel-alkali metal oxide particles having a particle size smaller than 200 mesh and being present in a concentration of 0.05 to 1.0 gram per square foot of steel base, applying a glass composition to a surface of the steel, and firing the steel at an elevated temperature to fuse the glass to the steel with said nickel-alkali metal oxide particles tending to eliminate fishscaling and hydrogen defects during the firing operation and also serving to improve the adherence between the glass and steel.

8. A method of glass coating steel to eliminate fishscaling and other hydrogen defects in the glass coating, comprising applying a layer of nickel-alkali metal oxide crystals to the outer surface of fine particles of nickelous oxide to provide a plurality of divided composite particles, applying the composite particles to a surface of the steel in an amount greater than 0.05 gram per square foot of steel surface, applying a glass composition to a surface of the steel base, and firing the steel at an elevated temperature to fuse the glass to the steel with the composite particles serving to eliminate fishscaling and other hydrogen defects during the firing operation.

9. A method of glass coating steel, comprising building a layer of nickel-alkali metal oxide crystals on the outer surface of fine particles of nickelous oxide having a particle size smaller than 200 mesh to provide an agglomerated crystalline mass, breaking up the mass into crystalline particles having a size smaller than 200 mesh, suspending said crystalline particles in an evaporable liquid to provide a slurry, applying the slurry to a surface of the steel, evaporating the liquid to provide a dried coating of finely divided crystalline particles on the steel with said particles being present in an amount greater than 0.05 gram per square foot of steel surface, applying a glass composition to a surface of said steel, and firing the steel at an elevated temperature to fuse the glass to the steel.

10. A method of glass coating a steel base, comprising cleaning the steel base, coating the steel base with an aqueous suspension containing finely divided crystals of nickel-alkali metal oxide, drying the aqueous suspension to provide a coating of said nickel-alkali metal oxide crystals in an amount of 0.05 to 1.0 gram per square foot of steel base, applying a glass coating to the steel article, and firing the steel at an elevated temperature to fuse the glass composition to the steel with the finely divided particles of the nickel-alkali metal oxide crystals serving to eliminate fishscaling and other hydrogen defects in the coating.

11. A method of glass coating steel to eliminate fishscaling and other hydrogen defects in the glass coating and provide improved adherence between the glass and the steel, comprising applying a coating of finely divided crystalline particles of nickel-alkali metal oxide to the steel surface with said nickel-alkali metal oxide particles being present in a concentration greater than 0.05 gram of dry particles per square foot of steel base and said alkali metal being selected from the group consisting of lithium, sodium, potassium, applying a glass composition to a surface of the steel, and firing the steel at an elevated temperature to fuse the glass to the steel.

12. A method of glass coating steel, comprising applying a coating of finely divided crystalline particles of nickel-lithium oxide to the steel surface with said nickel-lithium oxide particles having a particle size smaller than 200 mesh and being present in a concentration of 0.05 to 1.0 gram per square foot of steel base, applying a glass composition to the opposite surface of the steel, and firing the steel at an elevated temperature to fuse the glass to the steel, said nickel-lithium oxide particles serving to eliminate hydrogen defects in the glass coating.

13. The method of claim 12 in which said nickel-lithium oxide crystalline particles contain from 0.5% to 12.0% of lithium oxide.

14. A method of glass coating steel, comprising applying a layer of finely divided crystalline particles to a surface of steel in an amount greater than 0.05 gram of said dry particles per square foot of steel surface, said particles having a particle size smaller than 200 mesh and consisting essentially of a nucleus of nickelous oxide and an outer layer of nickel-lithium oxide crystals bonded thereto, said nickelous oxide nucleus comprising from 5% to 80% of said particles, applying a coating of vitreous enamel to a surface of the steel base, and firing the steel at an elevated temperature to fuse the vitreous enamel to the steel with the crystalline particles serving to eliminate hydrogen defects and improve the adherence between the vitreous enamel and the steel.

References Cited in the file of this patent

UNITED STATES PATENTS

| | | |
|---|---|---|
| 2,843,507 | Long | July 15, 1958 |
| 2,940,865 | Sullivan | June 14, 1960 |